May 9, 1944.   J. A. FEARS   2,348,533
TRAILER HITCH
Filed July 8, 1942   3 Sheets-Sheet 1
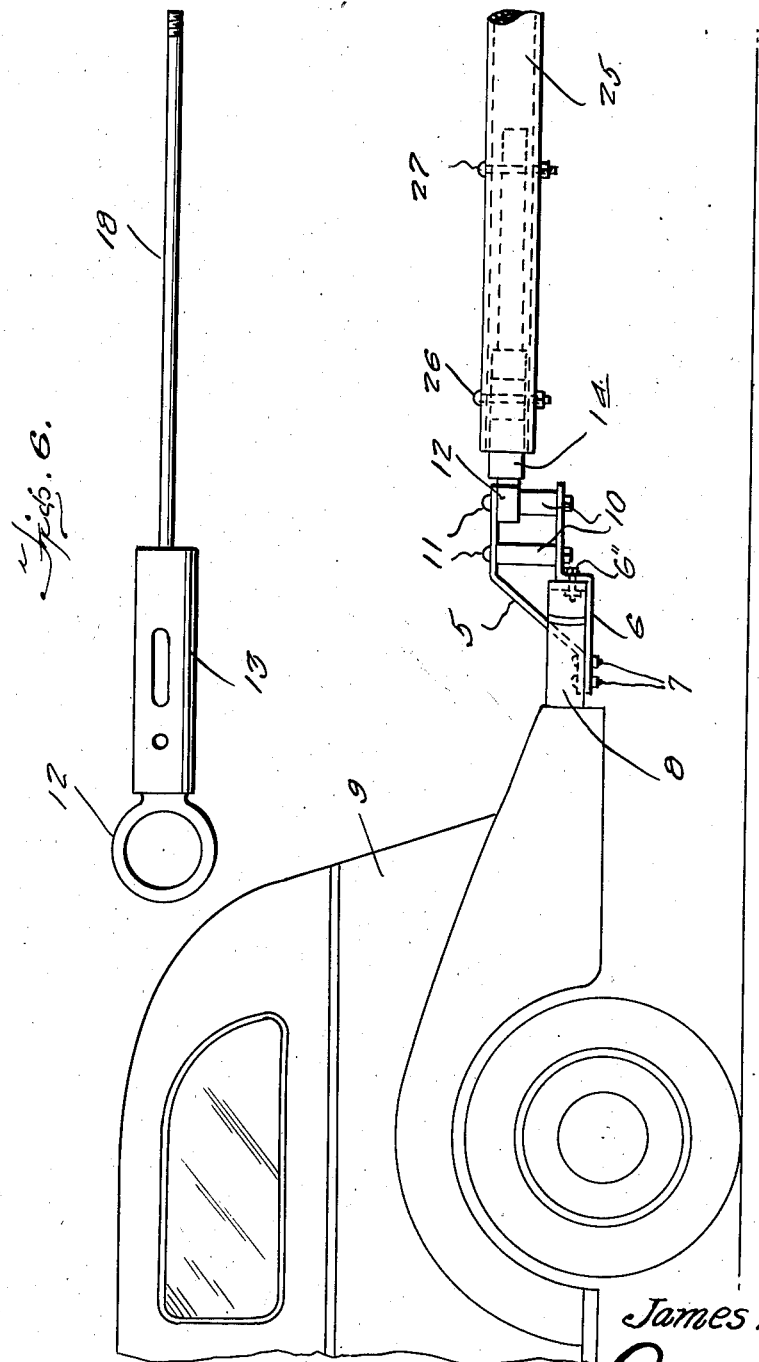
Inventor
James A. Fears
By Clarence A. O'Brien
and Harvey B. Jacobson
Attorneys

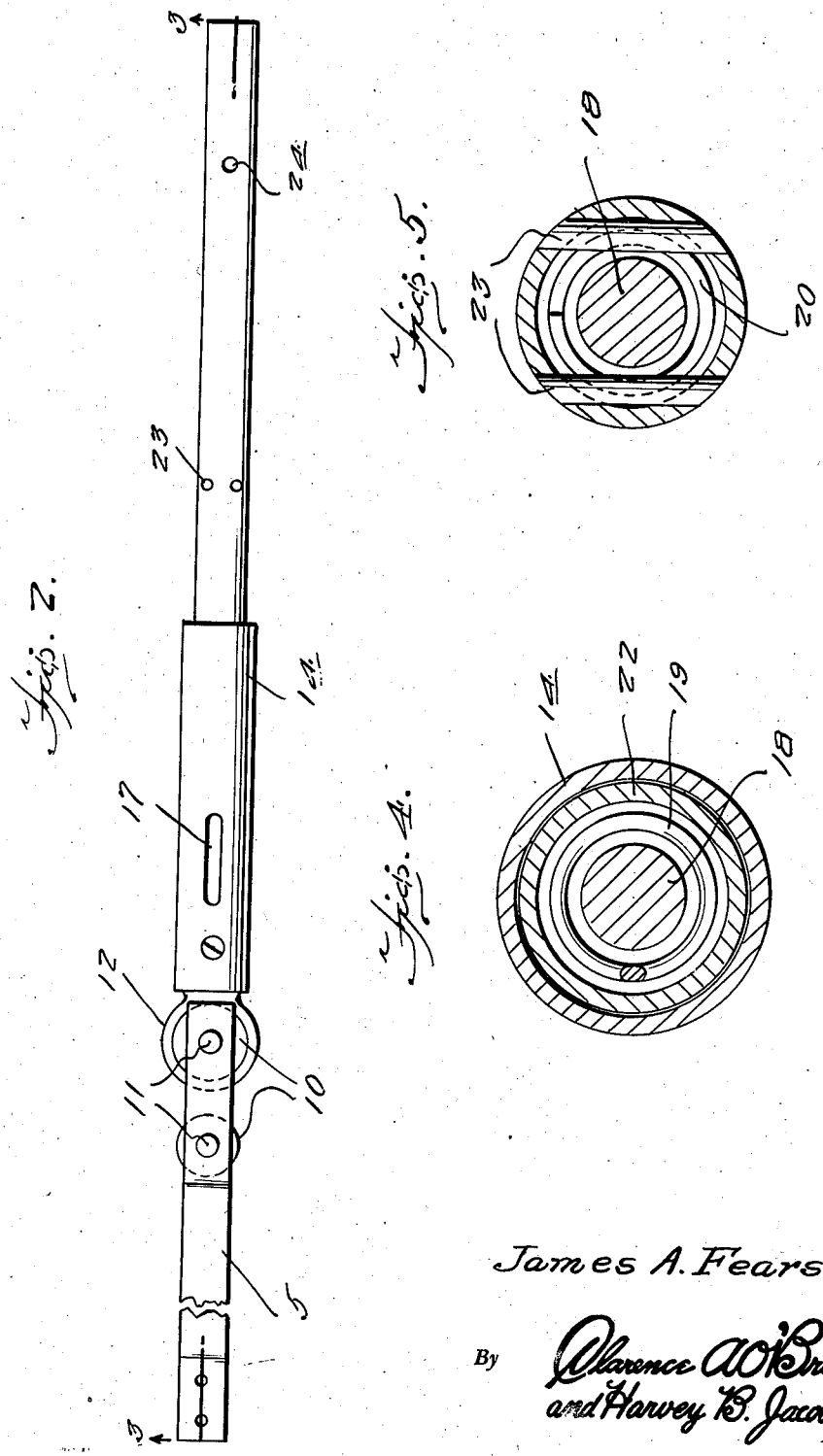

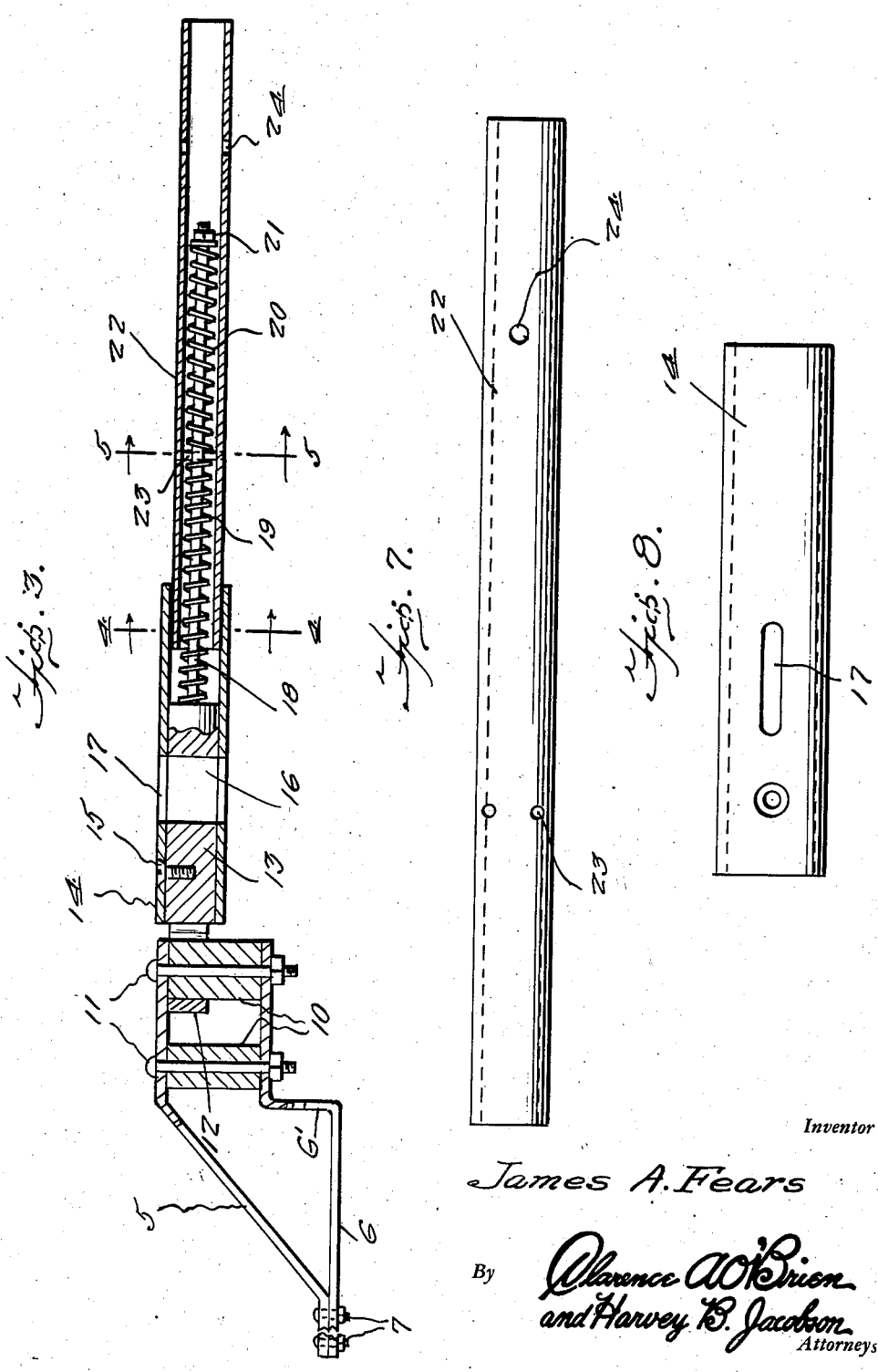

Patented May 9, 1944

2,348,533

UNITED STATES PATENT OFFICE 2,348,533

TRAILER HITCH

James A. Fears, Montgomery, Ala.

Application July 8, 1942, Serial No. 450,172

2 Claims. (Cl. 280—33.9)

The present invention relates to new and useful improvements in trailer hitches adapted for attaching a trailer tongue to a towing or pulling vehicle in a manner to provide a yieldable connection therebetween during both a forward and reverse movement of the vehicle.

A further object is to provide a device of this character of simple and practical construction, which is strong and durable, which may be easily and quickly attached in position for connecting the vehicles, and which otherwise is well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which—

Figure 1 is a fragmentary side elevational view of a towing vehicle showing the trailer hitch connected to the tow pole of a trailer.

Figure 2 is a top plan view of the trailer hitch.

Figure 3 is a longitudinal sectional view taken substantially on a line 3—3 of Figure 2.

Figures 4 and 5 are transverse sectional views taken respectively on the lines 4—4 and 5—5 of Figure 3.

Figure 6 is a top plan view of the eye connecting member forming the pivotal mounting for the trailer hitch.

Figure 7 is a top plan view of the tube providing a connection for the spring members of the device, and Figure 8 is a top plan view of the sleeve for the pivotal connecting member.

Referring now to the drawings in detail, wherein for the purpose of illustration I have disclosed a preferred embodiment of the invention, the numerals 5 and 6 designate the upper and lower connecting plates provided at their front ends with vertical bolts 7 positioned in front of the rear bumper 8 of a towing vehicle designated generally at 9. The plate members project rearwardly from the bumper and the lower plate 6 is formed with an offset 6' extending upwardly behind the bumper and attached thereto by bolts 6".

Spacing members 10 are carried at the rear ends of the plates 5 and 6 for maintaining the same in vertically spaced relation, the spacing members having bolts 11 extending therethrough for connecting the same to the upper and lower plates.

Pivotally mounted on the rear spacing member 10 is an eye 12 formed on one end of a cylindrical member 13 secured within a sleeve 14 by means of screws 15. The member 13 and sleeve 14 are formed with aligned elongated slots 16 and 17 extending vertically therethrough. Projecting from the rear end of the cylindrical member 13 is a rod 18 on which front and rear coil springs 19 and 20, respectively, are mounted, the rear coil spring being retained in position on the rod by means of a nut 21.

A tubular member 22 encloses the spring members 19 and 20 and is provided with a pair of transversely extending pins 23—23 forming an abutment for the adjacent ends of the springs 19 and 20. The front end of the tubular member 22 telescopes in the rear end of the sleeve 14, as shown to advantage in Figure 3 of the drawings, and the rear end of the tubular member 22 extends beyond the rear end of the rod 18, and is provided with a vertically extending opening 24.

The tow pole for the trailer is designated at 25 and is of tubular construction adapted for telescoping over the tubular member 22 as well as over the sleeve 14 and is provided with a front bolt 26 inserted through the slots 16 and 17 and also provided with a rear bolt 27 inserted through the opening 24.

In the operation of the device the rear bolt 27 engaged in the opening 24 of the tubular member 22 will be subjected to the pulling force exerted by the towing vehicle 9 on the rear spring 20 when the vehicles are moving in a forward direction while the front bolt 26 acts to limit the extent of relative movement of the tow pole 25 with respect to the members 13 and 14.

Likewise the front spring 19 serves as a yieldable connection for the coupling when the vehicles are moved in a reverse direction.

The upper and lower plate members 5 and 6 are spaced apart sufficiently to permit vertical movement of the coupling eye on its spacing member to compensate for variations in the vertical positions of the two vehicles when traveling over the road.

It is believed the details of construction and manner of use of the device will be readily understood from the foregoing without further detailed explanation.

Having described the invention what I claim is:

1. A trailer coupling comprising a pair of vertically spaced plates adapted for attaching to the rear bumper of a towing vehicle, one of said plates having a vertically extending portion positioned against the rear face of the bumper; a vertically arranged cylindrical spacing member between the plates, a connector having an eye pivotally and slidably engaged with said spacing member between the plates, a rod projecting rearwardly from the connector, a pair of coil springs on the rod, a tubular member freely receiving the rod and springs, a transverse pin in said tubular member positioned between adjacent ends of the springs to provide an abutment therefor, and means for attaching the tubular member to a trailer vehicle.

2. A coupling for a trailer having a tubular tow pole, said coupling comprising a tubular member slidably positioned in the tow pole, a bolt carried by the tow pole and positioned transversely of the tubular member, a connector having an eye at one end adapted for pivotal connection to a towing vehicle, a rod projecting rearwardly from the connector into said tubular member, a pair of coil springs mounted on the rod, and a pin extending transversely of the tubular member and positioned between adjacent ends of the springs to provide an abutment for each spring, said connector having a longitudinally extending slot, and a pin carried transversely of the tow pole and positioned in the slot to limit movement of the tow pole relative to the connector.

JAMES A. FEARS.